United States Patent
Geier et al.

(10) Patent No.: US 10,714,285 B2
(45) Date of Patent: Jul. 14, 2020

(54) ELECTROMECHANICAL SWITCHING DEVICE UTILIZING CONTACTS ON ALUMINUM CONDUCTORS AND METHOD OF ADHESION

(71) Applicant: SAFRAN ELECTRICAL & POWER, Blagnac (FR)

(72) Inventors: David Michael Geier, Punta Gorda, FL (US); Olivier Maka, Bradenton, FL (US)

(73) Assignee: SAFRAN ELECTRICAL & POWER, Blagnac (FR)

(*) Notice: Subject to any disclaimer, the term of this patent is extended or adjusted under 35 U.S.C. 154(b) by 0 days.

(21) Appl. No.: 16/418,013

(22) Filed: May 21, 2019

(65) Prior Publication Data

US 2019/0362915 A1 Nov. 28, 2019

Related U.S. Application Data

(60) Provisional application No. 62/675,815, filed on May 24, 2018.

(51) Int. Cl.
*H01H 33/08* (2006.01)

(52) U.S. Cl.
CPC ....... *H01H 33/08* (2013.01); *H01H 2205/002* (2013.01)

(58) Field of Classification Search
CPC ...... H01H 33/08; H01H 33/04; H01H 1/0206; H01H 1/5822; H01H 11/043; H01H 11/045; H01H 50/023; H01H 50/54; H01H 50/546; H01H 51/00; H01H 71/0235; H01H 71/24; H01H 71/2463; H01H 2201/002; H01H 2235/01; H01H 2205/002; B23K 9/22

USPC ............ 218/154, 146, 30, 31; 335/202, 201
See application file for complete search history.

(56) References Cited

U.S. PATENT DOCUMENTS

| | | | | |
|---|---|---|---|---|
| 2,284,405 A | * | 5/1942 | McArthur | H01J 21/065 331/97 |
| 3,339,048 A | | 8/1967 | Haderer | |
| 3,562,467 A | * | 2/1971 | Mooradian | H01H 11/045 200/268 |
| 3,569,653 A | * | 3/1971 | Cockshutt | H01H 11/045 200/267 |

(Continued)

FOREIGN PATENT DOCUMENTS

| | | |
|---|---|---|
| DE | 19935633 A1 | 2/2001 |
| EP | 3203492 A1 | 8/2017 |
| WO | 2009/137553 A1 | 11/2009 |

OTHER PUBLICATIONS

International Search Report/Written Opinion dated Aug. 20, 2019, PCT/US2019/033240, 19 pages.

*Primary Examiner* — William A Bolton
(74) *Attorney, Agent, or Firm* — Rankin, Hill & Clark LLP

(57) ABSTRACT

An electrical switching device and related methods, for use in aerospace applications include a first static contact assembly, a second static contact assembly, a movable contact assembly for making an electrical connection between the first and second static contact assemblies. The first contact assembly, the second contact assembly and the movable contact assembly each include a silver contact that is percussion welded to the aluminum substrate. Before percussion welding, the silver contact includes a projection for focusing an arc during percussion welding.

10 Claims, 7 Drawing Sheets

(56) References Cited

U.S. PATENT DOCUMENTS 3,574,570 A 4/1971 Gwyn, Jr.
4,139,140 A * 2/1979 Stockel ............... H01H 11/045
228/110.1

* cited by examiner

ELECTROMECHANICAL SWITCHING DEVICE UTILIZING CONTACTS ON ALUMINUM CONDUCTORS AND METHOD OF ADHESION

BACKGROUND

Aerospace switching devices include contacts to make and break electrical connections. These switching devices typically utilize copper, which is a relatively dense material and thus, at a particular size, the copper portion of the switching device has a relatively high mass that unnecessarily increases the overall mass of the switching device.

BRIEF DESCRIPTION

According to one aspect, an electrical switching device includes a first static contact assembly, a second static contact assembly arranged relative to the first static contact assembly such that first and second contact assemblies are separated by a gap, a movable contact assembly for making an electrical connection between the first and second static contact assemblies, an activator that when actuated, moves the movable contact assembly to make the electrical connection between the first and second static contact assemblies, and a spring biasing the movable contact assembly in a direction away from at least one of the first and second static contact assemblies to break the electrical connection between the first and second static contact assemblies when the activator is not actuated. At least one of the first contact assembly, the second contact assembly and the movable contact assembly include a substrate with a contact that is percussion welded thereto. The substrate comprises aluminum and the contact comprises silver. The contact, prior to being percussion welded to the substrate, includes a projection for focusing an arc when the contact is percussion welded to the substrate.

According to another aspect, a method of making an electrical switching device includes percussion welding a first contact to a first substrate to form a first static contact assembly, percussion welding a second contact to a second substrate to form a second static contact assembly, and percussion welding third and fourth contacts to a third substrate to form a movable contact assembly. The first and second static contact assemblies are relative to each other such that the first static contact assembly is separated by a gap from the second contact assembly. The movable contact assembly is arranged such that it is movable between an engaged position where the movable contact assembly makes an electrical connection between the first and second static contact assemblies, and a disengaged position where the movable contact assembly does not make an electrical connection between the first and second static contact assemblies. The method includes connecting the movable contact assembly to an activator that when actuated, moves the movable contact assembly to the engaged position, and connecting the movable contact assembly to a spring that biases the movable contact assembly to the disengaged position. The first, second, third, and fourth contacts each comprise silver. The first, second, and third substrates each comprise aluminum. The first, second, third, and fourth contacts each include, prior to percussion welding, a projection that focuses an arc during percussion welding.

DETAILED DESCRIPTION

Figure 1:
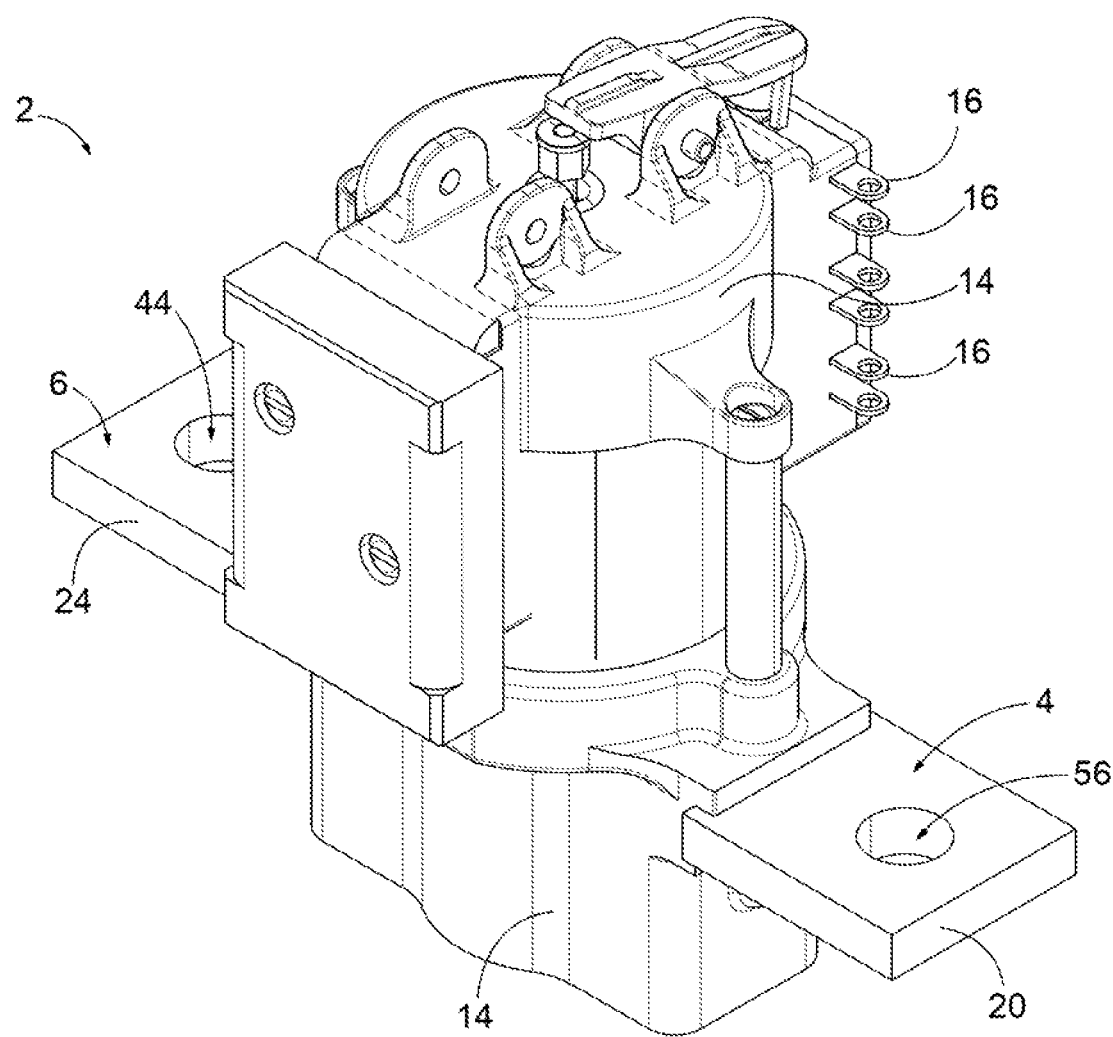
FIG. 1 is perspective view of an electrical switching device.
Figure 2:
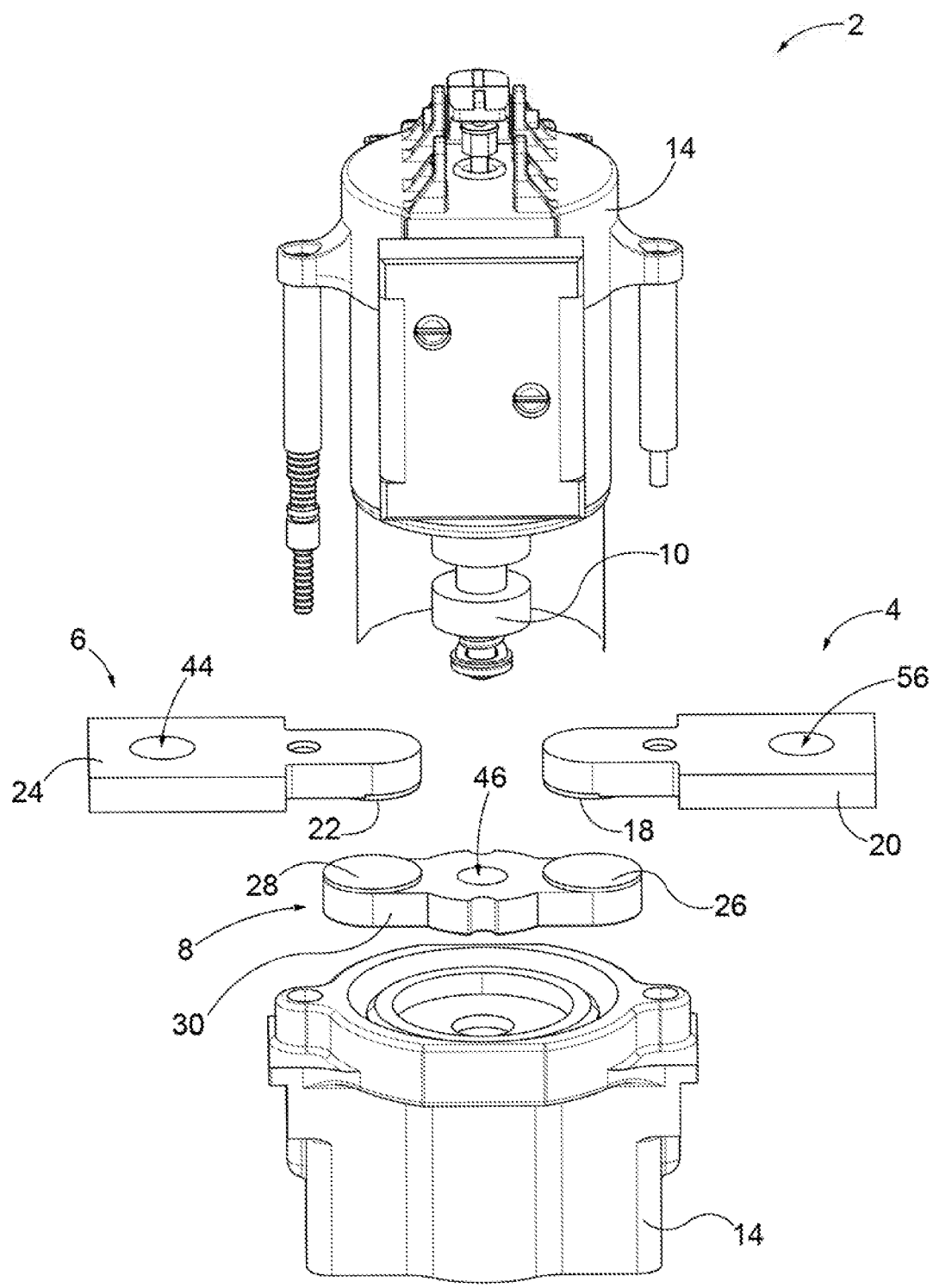
FIG. 2 is a partially exploded, perspective view of the electrical switching device.
Figure 3:
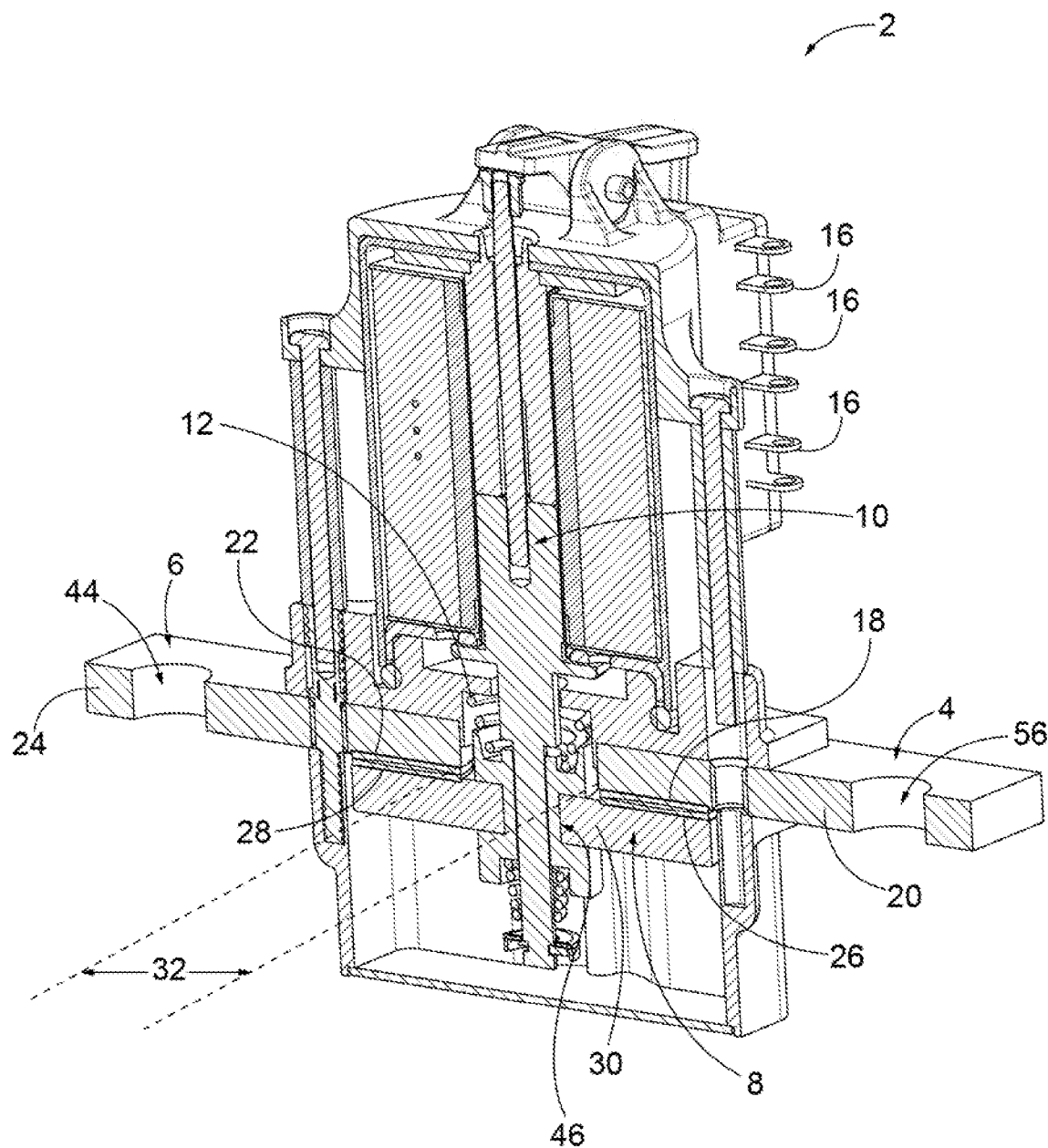
FIG. 3 is a cross-sectional view of an electrical switching device.
Figure 4:
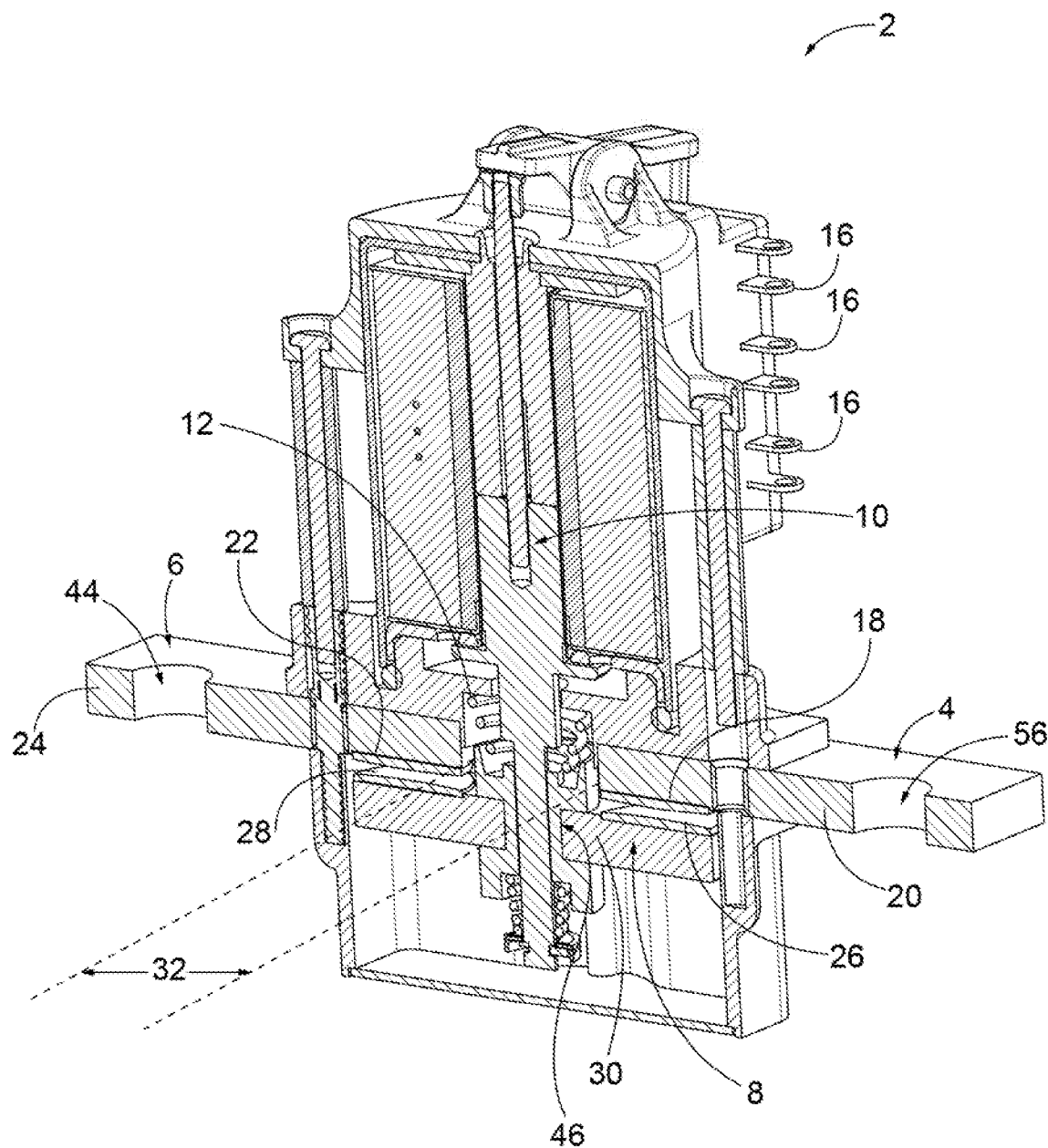
FIG. 4 is a cross-sectional view of an electrical switching device.

Referring to the figures, there is shown an electrical switching device 2 for making and breaking a flow of current through a circuit and for use is aerospace applications. The electrical switching device 2 includes a first static contact assembly 4, a second static contact assembly 6, and a movable contact assembly 8. The first and second static contact assemblies 4, 6 are arranged in the switching device 2 at static (i.e. fixed) locations and are immobilized relative to a structure 14 for housing the various components of the electrical switching device 2. The movable contact assembly 8 is movably mounted in the electrical switching device 2, and is movable relative to the structure 14 between an engaged position (FIG. 3) and a disengaged position (FIG. 4).

When in the engaged position, the movable contact assembly 8 makes an electrical connection between the first and second static contact assemblies 4, 6 by contacting both of the first and second static contact assemblies 4, 6. When the electrical connection is made, a current can pass between the first and second static contact assemblies 4, 6.

When moved from the engaged position to the disengaged position, the movable contact assembly 8 breaks the electrical connection between the first and second static contact assemblies 4, 6. When in the disengaged position, the movable contact assembly 8 is separated from, and therefore does not contact one or both of the first and second static contact assemblies 4, 6. When the electrical connection is not made, an electric current cannot pass between the first and second static contact assemblies 4, 6.

The electrical switching device 2 further includes an activator 10 and a spring 12, for moving the movable contact assembly 8 between the engaged and disengaged positions. The activator 10 is connected to the movable contact assembly 8, and can be actuated to move the movable contact assembly 8 toward (up in FIG. 4) the first and second static contact assemblies 4, 6 and into the engaged position to thereby make the electrical connection between the first and second static contact assemblies 4, 6. The activator 10 can comprise a solenoid for example.

The spring 12 is connected to the movable contact assembly 8, and biases (i.e. urges) the movable contact assembly 8 away from (down in FIG. 3) at least one of the first and second static contact assemblies 4, 6 and towards the disengaged position. When the activator 10 is not activated, the spring 12 moves the movable contact assembly 8 away from at least one of the first and second static contact assemblies 4, 6 and to the disengaged position, and thereby breaks the electrical connection between the first and second static contact assemblies 4, 6.

The electrical switching device 2 can also include electrical connectors 16 for connection with a controller (not shown) for controlling the electrical switching device 2 and activator 10.

Figure 5:
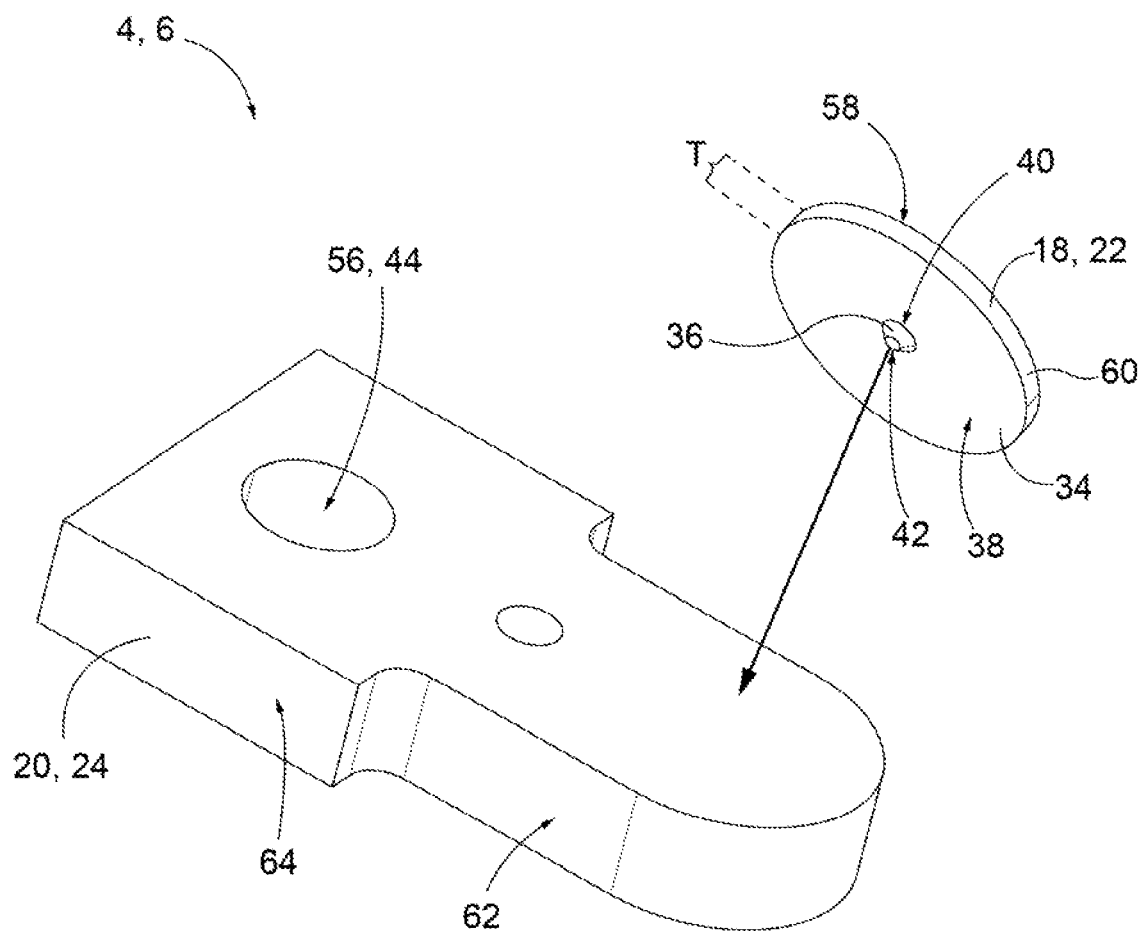
FIG. 5 is a perspective view of a contact and a substrate before being percussion welded together.

The first and second static contact assemblies 4, 6 may be identical, but this is not required. Thus, FIGS. 5 and 6 both show a static contact assembly which are labeled as the first static contact assembly 4 and the second static contact assembly 6, since the first and second static contact assemblies 4, 6 can be identical. The first static contact assembly 4 includes a first contact 18 arranged on a first substrate 20. The second static contact assembly 6 includes a second contact 22 arranged on a second substrate 24.

The first and second substrates 20, 24 can each define a square portion 64 and a rounded tab 62 that are connected to each other. The first and second substrates 20, 24 can also define respective holes 56, 44 on the square portion 64 for connecting to one or more electrical wires, leads, or circuits, which are electrically connected or disconnected by the electrical switching device 2. The first contact 18 and second contact 22 can be arranged on the rounded tab 62 of the respective first substrate 20 or second substrate 24.

The movable contact assembly 8 includes a third contact 26 and a fourth contact 28 arranged on a third substrate 30. The third and fourth contacts 26, 28 do not directly contact each other, but are spaced apart on the third substrate 30. The third substrate 30 may define a hole 46 for connecting to the activator 10.

The first and second contacts 18, 22, may be identical, but this is not required. As shown in the figures, the first and second contacts 18, 22 can each include a plate 34 and a projection 36. The plate 34 can include a first surface 38 and a second surface 58, where the first surface 38 and the second surface 58 face in opposite directions. The plate 34 can also include an annular rim 60 that connects the first surface 38 and the second surface 58. The projection 36 can be disposed on a surface 38 of the plate 34. The plate 34 and projection 36 can be a unitary piece, or separate pieces that are attached to each other. The plate 34 may have a round, flat shape as shown, or any other shape. The first surface 38 and the second surface 58 of the plate 34 may be substantially flat and generally parallel to one another.

The projection 36 may be centered at a center point of the plate 34 and the first surface 38. However this is not required, and the projection 36 may be arranged differently on the surface 38. The projection 36 may be sized, shaped, and arranged on the surface 38 in order to focus an arc during percussion welding of the first and second contacts 18, 22 to the respective first and second substrates 20, 24 as is described in more detail herein. More than one projection 36 may be included on the surface 38 to focus the arc.

As shown in the figures, the projection 36 may have a frustum shape, for example a circular frustum having a base 40 that defines a base diameter, and a top 42 that defines a top diameter, where the base diameter is greater than the top diameter. The base 40 may be arranged closer to the plate 34 and surface 38 than the top 42. The base 40 may occupy 1-20% of the area of the surface 38. The frustum may have a height from the base 40 to the top 42 that is from 1-100% of a thickness T of the plate 34. The projection 36 may be differently shaped. The third and fourth contacts 26, 28 may be identical to the first and second contacts 18, 22.

At least one of the first, second, and third substrates 20, 24, 30 comprise or consist of aluminum, and are thus electrically conductive. As used herein, "electrically conductive" or cognate terms, mean a material that has conductivity (a) of at least $1 \times 10^2$ S/m at 20° C. In one embodiment, each of the first, second, and third substrates 20, 24, 30 comprise or consist of aluminum, and are thus electrically conductive. Because aluminum is used, the first, second, and third substrates 20, 24, 30 have less mass than conventional copper substrates 20, 24, 30, and thus the electrical switching device 2 can be lighter than conventional electrical switching devices, and is more appropriate for use in aerospace applications, which require decreased weight and reduced actuation/deactuation time.

In one aspect, the first, second, and third substrates 20, 24, 30 consist of aluminum, i.e. are pure aluminum. This aspect includes aluminum metal that comprises no intentionally added components, elements, or material other than aluminum, and the aluminum metal includes less than 5 wt % of trace elements that may be naturally present but that are not intentionally added to the aluminum metal. In another aspect, the first, second, and third substrates 20, 24, 30 comprise aluminum, such as for example, an aluminum alloy, aluminum composite, or other material that is not pure aluminum.

The first, second, and third substrates 20, 24, 30 can include, before percussion welding, a cladding comprising nickel and/or silver covering all or a portion of the first, second, and third substrates 20, 24, 30. The cladding can include one or more layers, such as for example, a first layer comprising nickel, and a second layer comprising silver over the first layer. These may be included to control oxidation of the aluminum included in the first, second, and third substrates 20, 24, 30.

At least one of the first, second, third, and fourth contacts 18, 22, 26, 28 comprise or consist of silver, and are thus electrically conductive. In one embodiment, each of the first, second, third, and fourth contacts 18, 22, 26, 28 comprise or consist of silver, and are thus electrically conductive. By including the silver first, second, third, and fourth contacts 18, 22, 26, 28, the electrical switching device 2 is able to make and break an arc, i.e. a flow of current through a circuit. Such making and breaking of an arc could cause melting of the aluminum first, second, and third substrates 20, 24, 30 if they did not include the respective silver first, second, third, and fourth contacts 18, 22, 26, 28. As such, the electrical switching device 2 can be used for making and breaking a flow of current through a circuit.

In one aspect, the first, second, third, and fourth contacts 18, 22, 26, 28 consist of silver, i.e. are pure silver. This aspect can include silver metal that includes no intentionally added components, elements, or material other than silver, and the silver metal includes less than 5 wt % of trace elements that may be naturally present but that are not intentionally added to the silver metal. In another aspect, the first, second, and third substrates 20, 24, 30 comprise silver, such as for example, silver alloy, silver composite, or other material that is not pure silver. In one embodiment, the first, second, third, and fourth contacts 18, 22, 26, 28 comprise silver, silver cadmium oxide, silver tin oxide, or silver nickel alloy. The first, second, third, and fourth contacts 18, 22, 26, 28 may also comprise or consist of copper.

When the first and second static contact assemblies 4, 6 are arranged relative to each other in the electrical switching device 2, they are separated by a gap 32 that electrically isolates the first static contact assembly 4 from the second static contact assembly 6. When the movable contact assembly 8 is arranged in the electrical switching device 2 and is in the disengaged position, being biased toward the disengaged position by the spring 12, no electrical connection is made between the first and second static contact assemblies 4, 6.

When the activator 10 is actuated, it overcomes the biasing forces of the spring 12, and moves the movable contact assembly 8 from the disengaged position to the engaged position. In the engaged position, the movable contact assembly 8 touches both the first and second static contact assemblies 4, 6 and thereby establishes an electrical connection between the first and second static contact assemblies 4, 6. This electrical connection is made by the movable contact assembly 8 because it is conductive in that it comprises the conductive silver third and fourth contacts 26, 28 and the conductive aluminum third substrate 30.

In the engaged position, the third contact 26 on the movable contact assembly 8 touches the first contact 18 on the first static contact assembly 4, and the fourth contact 28 on the movable contact assembly 8 touches the second contact 22 on the first static contact assembly 4. In this way, an electric current can be transmitted through the movable contact assembly 8 and between the first and second static contact assemblies 4, 6.

In the disengaged position, the third contact 26 on the movable contact assembly 8 does not touch the first contact 18 on the first static contact assembly 4, and/or the fourth contact 28 on the movable contact assembly 8 does not touch the second contact 22 on the first static contact assembly 4. In this way, an electric current or arc is broken by the movable contact assembly and an electric current cannot be transmitted through the movable contact assembly 8 and between the first and second static contact assemblies 4, 6.

Figure 7:
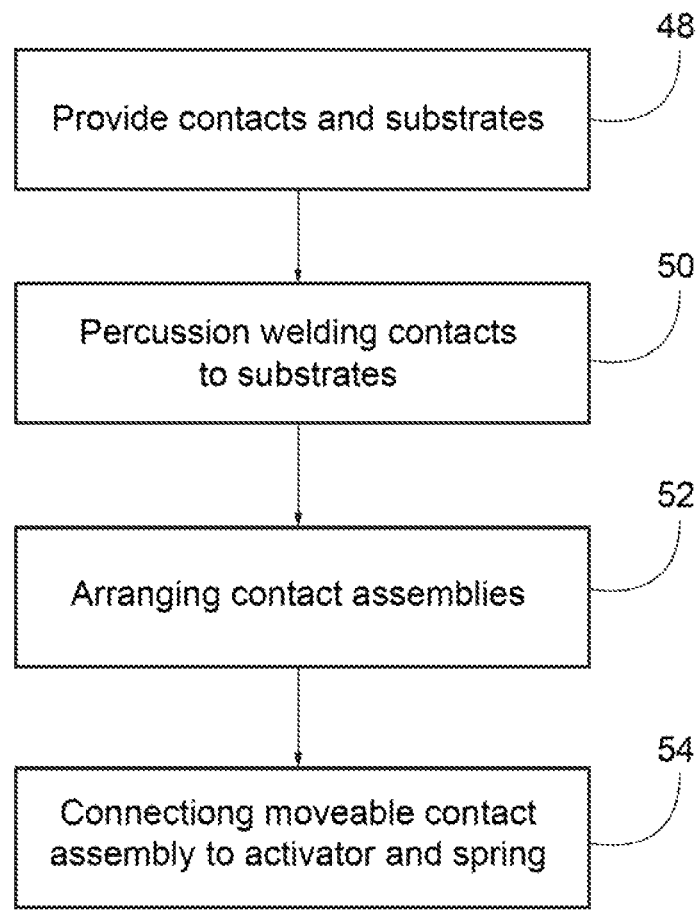
FIG. 7 is a flowchart illustrating a method of making an electrical switching device.

FIG. 7 illustrates a method of making the electrical switching device 2. At 48, the first, second, third, and fourth contacts 18, 22, 26, 28, and the first, second, and third substrates 20, 24, 30 are provided. At 50, the first contact 18 is percussion welded to the first substrate 20 to form the first static contact assembly 4, the second contact 22 is percussion welded to the second substrate 24 to form the second static contact assembly 6, and the third and fourth contacts 26, 28 are percussion welded to the third substrate 30 to form the movable contact assembly 8.

Figure 6:
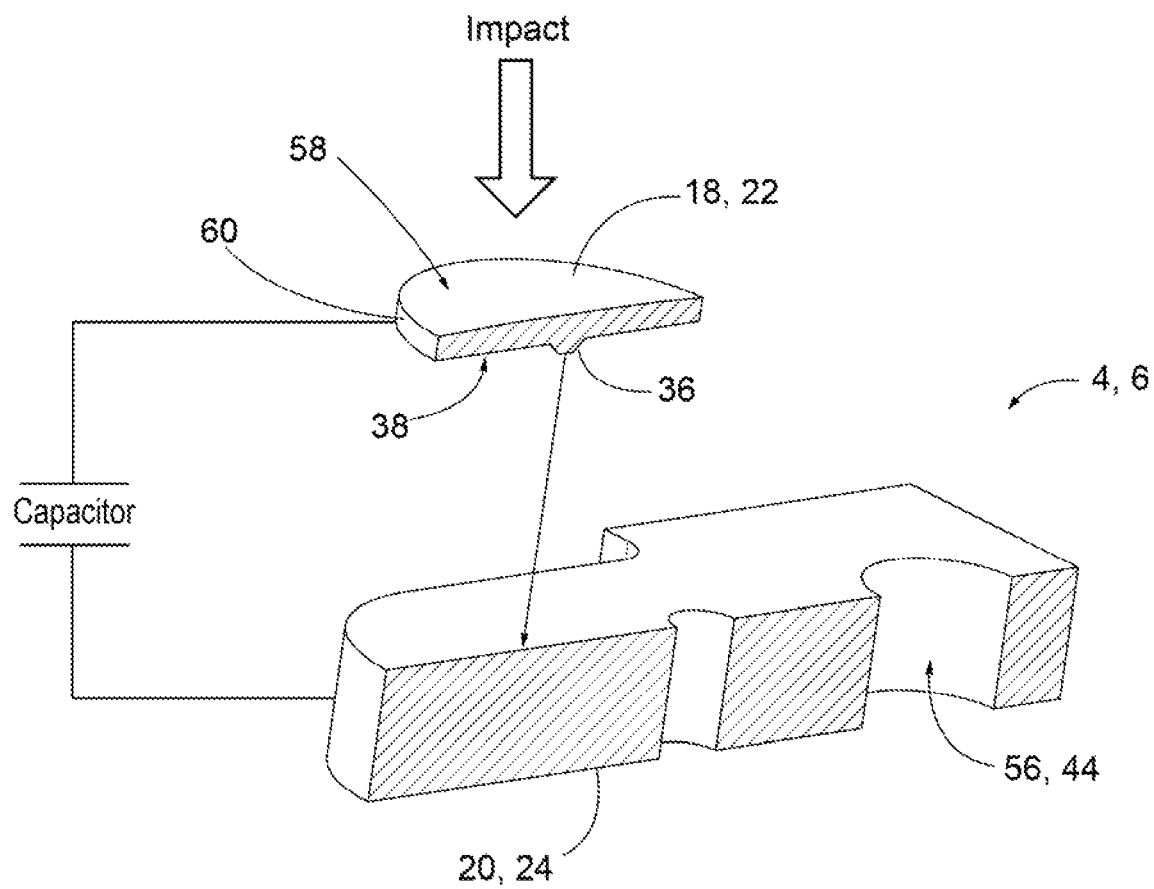
FIG. 6 is a schematic view of a method of percussion welding a contact to a substrate.

FIG. 6 illustrates percussion welding the first and second contacts 18, 22 to the respective first and second substrates 20, 24 to form the respective first and second static contact assemblies 4, 6. The movable contact assembly 8 can be produced in the same, or a similar manner as described herein for the first and second static contact assemblies 4, 6, and therefore the production of the movable contact assembly 8 has the same characteristics, and results in the same benefits as described herein for the manner of making the first and second static contact assemblies 4, 6.

As depicted in FIG. 6, a capacitor is attached to the first or second contact 18, 22 and the respective first or second substrate 20, 24. The capacitor generates an electrical discharge, which causes a high temperature arc to form between the first or second contact 18, 22 and the respective first or second substrate 20, 24. Following the electrical discharge, an impact force is applied to push the first or second contact 18, 22 and the respective first or second substrate 20, 24 together such that the surface 38 and the projection 36 (which may be vaporized by the arc) are pressed against (brought into contact with), and thus abut the first or second substrate 20, 24, to form the respective first or second static contact assembly 4, 6.

The arc formed by the electrical discharge is focused by the projection 36. Such focusing directs the arc to form between the projection 36 (as opposed to the entire surface 38) and a particular point on the first or second substrate 20, 24. Focusing of the arc inhibits melting and deformation of the bulk of the first or second substrate 20, 24, and instead confines the arc to form at a relatively small area on the aluminum first and second substrates 20, 24.

Focusing of the arc during percussion welding thus inhibits a significant increase in the temperature of the bulk of the aluminum first and second substrates 20, 24 that is outside this relatively small area, and a heat affected zone is therefore relatively small and oxide formation is relatively limited, thereby improving the lifespan and performance of the device 2. The geometry (e.g. size, shape), number, and location of the projection(s) on the first and second contact 18, 22 can affect the strength and quality of the weld between the first and second contacts 18, 22 and the respective first and second substrates 20, 24.

Without the projection 36 being included on the first and second contacts 18, 22, the arc formed during percussion welding would not be focused, and thus could be spread out over a larger area on the aluminum first and second substrates 20, 24. Accordingly, the percussion welding could produce a much larger heat affected zone on the aluminum first and second substrates 20, 24, and could undesirably cause melting or deformation of the aluminum first and second substrates 20, 24. Similarly, if other attachment methods were used, melting and deformation of the aluminum first and second substrates 20, 24 could occur. This is because other methods produce higher temperatures through more volume of the aluminum first and second substrates 20, 24. Further, other methods could cause excessive oxide formation in the aluminum first and second substrates 20, 24, which would inhibit the formation of a strong welded joint between the first or second contacts 18, 22 and the respective aluminum first or second substrates 20, 24. This could also lead to increased resistance in the device 2.

During percussion welding, the projection 36 is vaporized and is pressed into the first or second substrates 20 to create a welded joint. Therefore, it will be understood that the first and second contacts 18, 22 include the projection 36 before percussion welding, but may not include the projection after percussion welding since the projection 36 is vaporized and forms part of the welded junction between the first and second contacts 18, 22 and the respective first and second substrates 20, 24. The third and fourth contacts 26, 28 are percussion welded to the third substrate 30 in a similar manner as described herein for the first and second contacts 18, 22 and the respective first and second substrates 20, 24. When arranged on the third substrate 30, the third and fourth contacts 26, 28 do not directly contact each other.

At 52, the first and second static contact assemblies 4, 6 are arranged relative to each other, for example mounted on/in the structure 14, such that the first static contact assembly 4 is separated by the gap 32 from the second static contact assembly 6. Also at 52, the movable contact assembly 8 is arranged, for example mounted on/in the structure 14, such that the movable contact assembly 8 is movable between an engaged position (FIG. 3) where the movable contact assembly 8 makes the electrical connection between the first and second static contact assemblies 4, 6, and a disengaged position (FIG. 4) where the movable contact assembly 8 does not make the electrical connection between the first and second static contact assemblies 4, 6.

At 54, the movable contact assembly 8 is connected to the activator 10 and spring 12 for moving the movable contact assembly 8 between the engaged position and the disengaged position. The spring 12 biases the movable contact assembly 8 toward the disengaged position, and the activator 10, when actuated, moves the movable contact assembly 8 to the engaged position.

It will be appreciated that various of the above-disclosed and other features and functions, or alternatives or varieties thereof, may be desirably combined into many other different systems or applications. Also that various presently unforeseen or unanticipated alternative, modifications, variations or improvements therein may be subsequently made by those skilled in the art which are also intended to be encompassed by the following claims.

The invention claimed is:

1. A method of making an electrical switching device, comprising:
   percussion welding a first contact to a first substrate to form a first static contact assembly,
   percussion welding a second contact to a second substrate to form a second static contact assembly, and
   percussion welding third and fourth contacts to a third substrate to form a movable contact assembly,
   arranging the first and second static contact assemblies relative to each other such that the first static contact assembly is separated by a gap from the second contact assembly,
   arranging the movable contact assembly such that the movable contact assembly is movable between an engaged position where the movable contact assembly makes an electrical connection between the first static contact assembly and the second static contact assembly, and a disengaged position where the movable contact assembly does not make the electrical connection between the first static contact assembly and the second static contact assembly,
   connecting the movable contact assembly to an activator that when actuated, moves the movable contact assembly to the engaged position, and
   connecting the movable contact assembly to a spring that moves the movable contact assembly to the disengaged position when the activator is not actuated,
   wherein the first contact, the second contact, the third contact, and the fourth contact each comprise silver,
   wherein the first substrate, the second substrate, and the third substrate each comprise aluminum, and
   wherein the first contact, the second contact, the third contact, and the fourth contact each include, prior to the percussion welding, a projection that focuses an arc during the percussion welding.

2. The method according to claim 1, wherein the third contact and the fourth contact do not directly contact each other.

3. The method according to claim 1, wherein:
   the first contact, the second contact, the third contact, and the fourth contact each comprise a plate, and
   the projection protrudes from the plate.

4. The method according to claim 3, wherein the projection is centered at a center point of the plate.

5. The method according to claim 3, wherein during the percussion welding, the projection and the plate are brought into contact with one of the first substrate, the second substrate, and the third substrate.

6. The method according to claim 3, wherein:
   the projection is a frustum,
   the frustum includes a base that defines a base diameter, and a top that defines a top diameter,
   the base diameter is greater than the top diameter, and
   the base is arranged closer to the plate than the top.

7. The method according to claim 1, when the movable contact assembly is in the engaged position, the first contact touches the third contact and the second contact touches the fourth contact.

8. The method according to claim 7, wherein when the movable contact assembly is in the disengaged position, the third contact does not touch the first contact and the fourth contact does not touch the second contact.

9. The method according to claim 1, herein when the activator is not actuated, the spring moves the movable contact assembly to the disengaged position.

10. The method according to claim 1, wherein before the percussion welding, the first substrate, the second substrate and the third substrate each include a cladding comprising nickel and silver.

* * * * *